(12) United States Patent
Hauki et al.

(10) Patent No.: US 7,753,414 B2
(45) Date of Patent: Jul. 13, 2010

(54) PIPE COUPLING

(75) Inventors: Peter J. Hauki, Virsbo (SE); Yngve Lundequist, Virsbo (SE)

(73) Assignee: Uponor Innovation AB, Virsbo (SE)

( * ) Notice: Subject to any disclaimer, the term of this patent is extended or adjusted under 35 U.S.C. 154(b) by 0 days.

(21) Appl. No.: 12/095,379

(22) PCT Filed: Nov. 28, 2006

(86) PCT No.: PCT/IB2006/054474

§ 371 (c)(1),
(2), (4) Date: Aug. 4, 2008

(87) PCT Pub. No.: WO2007/063486

PCT Pub. Date: Jun. 7, 2007

(65) Prior Publication Data

US 2008/0290653 A1     Nov. 27, 2008

(30) Foreign Application Priority Data

Dec. 1, 2005    (EP) ................................. 05111568

(51) Int. Cl.
*F16L 33/22* (2006.01)
(52) U.S. Cl. .................... 285/253; 285/421; 24/279
(58) Field of Classification Search ............. 285/252, 285/253, 367, 368, 373, 412, 419, 420, 421; 24/20 R, 279
See application file for complete search history.

(56) References Cited

U.S. PATENT DOCUMENTS

| | | | | |
|---|---|---|---|---|
| 1,286,388 A * | 12/1918 | Mulconroy | ............. | 15/104.16 |
| 2,895,197 A * | 7/1959 | Agne et al. | .................... | 24/279 |
| 2,943,869 A * | 7/1960 | Nordin | ......................... | 285/90 |
| 4,039,212 A | 8/1977 | Skarud | | |
| 4,516,296 A * | 5/1985 | Sherman | ...................... | 24/279 |
| 4,556,241 A * | 12/1985 | Weinhold | .................... | 285/244 |
| 5,177,836 A * | 1/1993 | Kemmerich | ................ | 24/20 R |
| 5,814,763 A | 9/1998 | Kirma et al. | | |
| 5,865,476 A * | 2/1999 | Kramer | ...................... | 285/242 |
| 5,899,506 A * | 5/1999 | Tseeng | .................. | 285/148.23 |
| 6,041,823 A * | 3/2000 | Kusama | ....................... | 138/99 |
| 6,052,873 A * | 4/2000 | Cuno | .......................... | 24/20 R |
| 6,361,082 B1 * | 3/2002 | Hauki et al. | ................. | 285/253 |
| 2004/0150226 A1 * | 8/2004 | Hystad | ......................... | 285/368 |
| 2005/0099001 A1 * | 5/2005 | Cassel et al. | ................... | 285/23 |

FOREIGN PATENT DOCUMENTS

| | | |
|---|---|---|
| FR | 2 863 335 | 6/2005 |
| SE | 5 26595 | 9/2004 |
| WO | 00/01973 | 1/2000 |

* cited by examiner

*Primary Examiner*—James M Hewitt
(74) *Attorney, Agent, or Firm*—Occhiuti Rohlicek & Tsao LLP

(57) ABSTRACT

A pipe coupling for connection to a pipe end of pipe made of polymer material includes an inner sleeve which is intended for insertion into the pipe end and for abutment with the inner surface of the pipe end, and an outer sleeve which is intended for abutment with the outer surface of the pipe end and which includes a slot-like opening. The pipe coupling also includes a device for adjusting the opening, and a pre-widening device positioned between the edges of the slot-like opening. The pre-widening device makes the slot-like opening larger such that the inner diameter of the outer sleeve is larger than the outer diameter of the pipe.

4 Claims, 2 Drawing Sheets

PIPE COUPLING

CROSS-REFERENCE TO RELATED APPLICATIONS

This application is the National Stage of International Application No. PCT/IB2006/054474, filed Nov. 28, 2006, which claims the priority of European Application No. 05111568.1, filed Dec. 1, 2005. The contents of both applications are hereby incorporated by reference in their entirety.

BACKGROUND OF THE INVENTION

The invention relates to a pipe coupling for connection to a pipe end of a pipe made of polymer material, comprising an inner sleeve which is intended for insertion into the pipe end and for abutment with the inner surface of said pipe end, an outer sleeve which is intended for abutment with the outer surface of said pipe end and which includes a slot-like opening, and means for adjusting said opening.

A metal pipe coupling for interconnecting cross-linked polyethylene pipes installed in hot and cold water systems and in central and district heating pipe systems is known to the art from U.S. Pat. No. 4,039,212 and WO 00/01973. The coupling comprises an inner sleeve which is intended for insertion into the pipe and for abutment with the inner surface of said pipe end, an outer sleeve which is intended for abutment with the outer surface of said pipe end and which includes a slot-like opening, and means for adjusting said opening. When the coupling is assembled in the pipe end first the slot-like opening in the outer sleeve must be widened forcibly at the assembling site. Thereafter the outer sleeve is fitted onto the end of the pipe. Thereafter the inner sleeve is fitted into the end of the pipe. Thereafter the outer sleeve is pushed on the pipe end to a position over the inner sleeve and the forcibly widened slot-like opening is allowed to return to its original state. The outer sleeve is tightened against the pipe by the means for adjusting the opening. Widening of the slot-like opening is very hard and cumbersome and a tool for widening the opening is needed. Therefore assembling the coupling on site is demanding and requires good skills from the assembling fitter.

BRIEF DESCRIPTION OF THE INVENTION

An object of the present invention is to provide a new and improved coupling. The coupling of the invention is characterized in that the coupling further comprises pre-widening means positioned between the edges of the slot-like opening such that the inner diameter of the outer sleeve is larger than the outer diameter of the pipe.

The coupling comprises an inner sleeve which is intended for insertion into the pipe end and for abutment with the inner surface of said pipe end, an outer sleeve which is intended for abutment with the outer surface of said pipe end and which includes a slot-like opening, and means for adjusting said opening. The coupling further comprises a pre-widening means positioned between the edges of the slot-like opening. The pre-widening means makes the slot-like opening larger such that the inner diameter of the outer sleeve is larger than the outer diameter of the pipe. It is easy to assemble the coupling on site because the outer sleeve can be fitted over the pipe end without a tool and extra measures during the assembling. The assembling of the coupling is quick and simple and the number of tools needed is not very high.

BRIEF DESCRIPTION OF THE FIGURES

The invention will now be described in more detail with reference to the accompanying drawings in which.

DETAILED DESCRIPTION OF THE INVENTION

Figure 1:
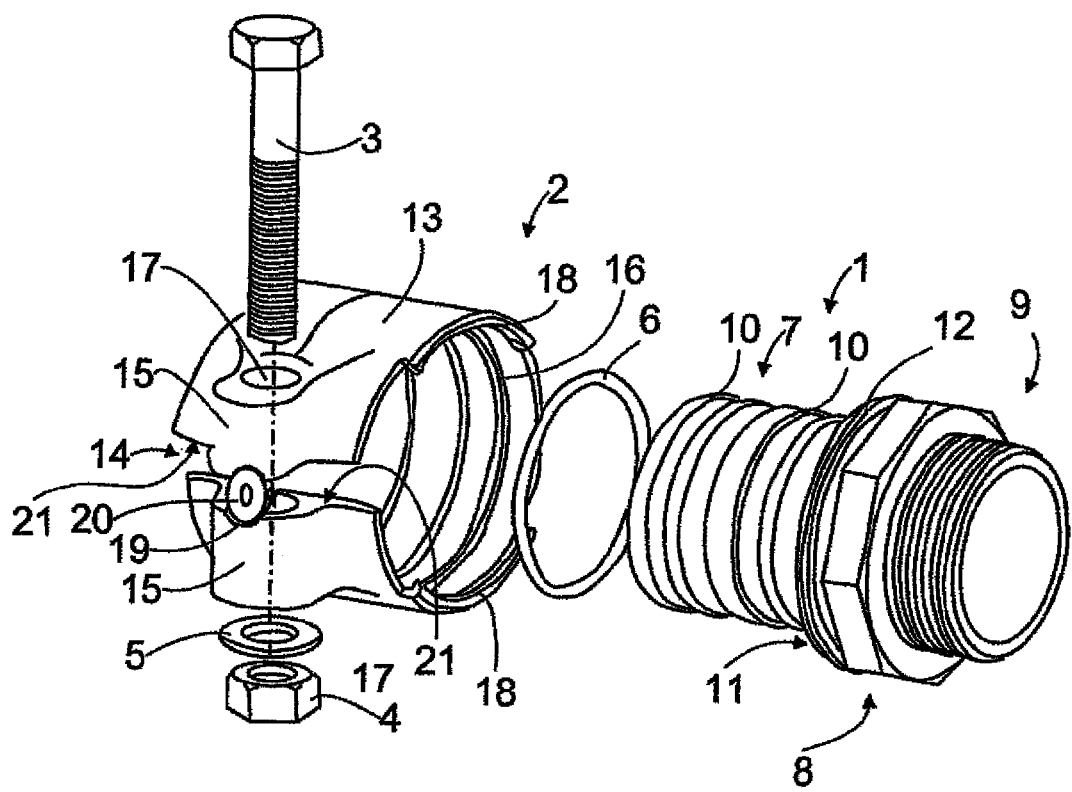
FIG. 1 is a schematic exploded view of a pipe coupling.

FIG. 1 illustrates the component parts of the coupling, these component parts including an inner sleeve 1, an outer sleeve 2, a bolt or a screw 3, a nut 4, a washer 5 and an O-ring 6.

The inner sleeve 1 is manufactured of a suitable material in the present context, preferably of a metallic material, although other materials may be suitable, such as various polymer materials, for instance. Particularly suitable inner sleeve materials are forged, sand-moulded and cast brass alloys.

The inner sleeve 1 is designed for connection to another coupling part and shall also provide an effective gripping and sealing function against the formable and ductile pipe wall and shall be capable of being locked to the outer sleeve. Accordingly, the inner sleeve includes a gripping and sealing part 7, a locking part 8, and a connecting part 9.

The gripping and sealing part of the inner sleeve, against which the ductile pipe wall is intended to abut, is provided with one or preferably more gripping ridges 10. The gripping ridge or ridges 10 includes/include a first side surface which is slightly inclined so as to enable the pipe to be fitted onto the inner sleeve 1 more easily, and a second side surface which slopes abruptly to form an edge which provides an effective gripping and sealing function. The gripping and sealing part 7 also includes a groove for receiving the O-ring 6. The gripping and sealing part 7 of the inner sleeve is designed for cooperation with the inner surface of the outer sleeve 2. The pipe is made of polymer material, such as cross-linked polyethylene PEX or other suitable plastic material for making flexible pipes.

The locking part 8 on the inner sleeve 1 has an abutment edge 11 for abutment with the end of the pipe fitted onto said sleeve. The locking part 8 also includes a circular locking groove 12 for coaction with the outer sleeve 2 in a manner to fix and lock said sleeve. The locking part 8 may have an outer octahedral shape or some other shape which will enable it to be gripped by a suitable tool.

The connection part 9 of the inner sleeve may be constructed in different ways, all in accordance with requirements, although it will conveniently include a conventional thread for screw connection with another coupling part (not shown).

The outer sleeve 2 is made of a material suitable for the purpose intended, preferably of a metallic material, such as brass or a bronze alloy, although other materials are also conceivable in this context, such as polymer materials, for instance.

The outer sleeve 2 is constructed so as to enable it to exert a clamping force on the outside of the pipe and so that it can be locked to the inner sleeve 1 in the pull direction. The outer sleeve 2 comprises generally a clamping sleeve 13 that has a slot-like opening 14 and a jaw 15 on each side of said opening 14. The inner surface of the sleeve intended for abutment with the outside of the pipe includes abutment grooves 16. The jaws 15 include through-penetrating holes 17 through which the screw 3 passes. Arranged on one end-wall part of the clamping sleeve 13 there are two mutually opposing, part-circular locking shoulders 18 which are intended for coaction with the inner sleeve 1. The slot-like opening 14 includes a centrally arranged circular opening 19.

When manufacturing the outer sleeve 2, the inner surface of said sleeve is first machined in a lathe to a measurement which corresponds to the diameter of the sleeve when the slot-like opening is fully closed, i.e. to a radius that is smaller than the outer measurement of the pipe. The slot-like opening 14 is then, and only then, cut into the sleeve. When the slot-like opening is fully closed, the inner diameter of the outer sleeve will preferably be about 1-3.5 mm smaller than the outer diameter of the pipe.

A pre-widening means, such as a distance washer 20, is positioned between the edges 21 of the slot-like opening 14. The pre-widening means makes the distance between the edges 21 such that the inner diameter of the outer sleeve 2 is larger than the outer diameter of the pipe.

When the coupling is assembled to the pipe, the first step is to push the pre-widened outer sleeve onto the pipe. The size of the pre-widening means is such that the locking shoulders 18 will pass freely when the inner sleeve 1 is inserted into the said pipe end.

In a second step, the inner sleeve 1 is fitted into the end of the pipe, by pushing the gripping and sealing part 7 of the inner sleeve, said part carrying the O-ring 6 seated in groove into the pipe end so that the edge of said pipe will lie in abutment with the abutment edge 11 on the locking part 8. The pipe slides relatively smoothly over the slightly inclined side surfaces on the gripping ridges 10.

In a third step, the outer sleeve 2 is pushed on the pipe to a position in which the locking shoulders 18 will snap into the locking groove 12 in the inner sleeve 1 when the pre-widening means is removed and the slot-like opening is allowed to return to its original state. The outer sleeve 2 is therewith secured in relation to the inner sleeve 1 and the pipe end. The pre-widening means is not needed anymore and therefore it can be thrown away.

The limited peripheral extension of the locking shoulders 18 and their distance from the slot-like opening 14 means that the slot-like opening need only be widened with the pre-widening means to a limited extent in order to fit the outer sleeve 2 onto the pipe end. In respect of those pipe sizes that are relevant in the present context, which may vary between 25-110 mm, the slot-like opening will need only be widened to between about 6-19 mm from a width of about 2 mm in its unaffected state. Thus the size of the pre-widening means is about 6-19 mm. However, if the slot-like opening 14 includes a centrally arranged circular opening 19 the pre-widening means may be circular seen in the axial direction of the pre-widening means. Thus, the pre-widening means may, for example, be a cylindrical distance washer 20. In such a case the diameter of the cylindrical distance washer 20 may be, for example, about 8-21 mm if the circular pre-widening means is positioned to fit to the grooves of the circular opening 19.

In the last step of fitting the outer sleeve, the sleeve is tightened against the pipe by inserting the screw 3 through the holes 17 and the washer 5 and screwing the nut 4 onto the screw and slowly tightening the screw until the jaws 15 are in abutment with one another and the slot-like opening is closed. No complicated mounting instructions or the use of complicated tools, such as torque wrenches, are required, since it is only necessary to tighten the nut and screw joint until the slot-like opening is fully closed. As mentioned before, the outer sleeve is machined to an inner diameter which corresponds to the diameter of the sleeve when in its tightened state, which means that the sleeve will be essentially cylindrical when tightened.

Figure 2:
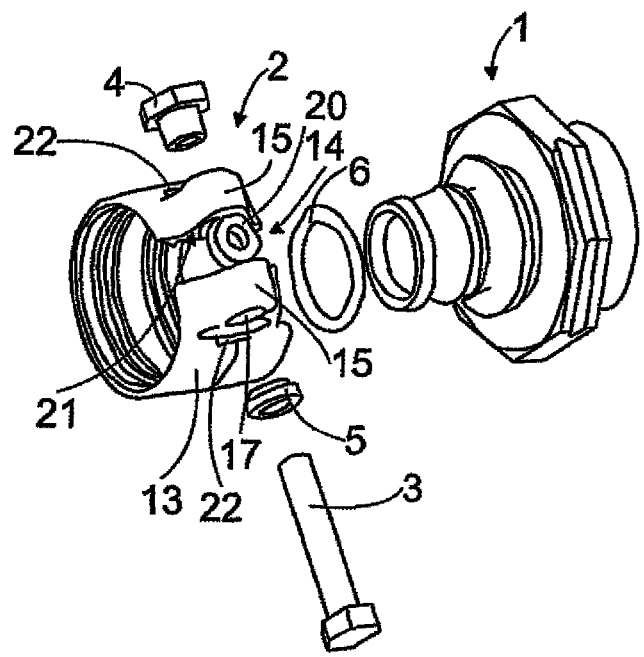
FIG. 2 is a schematic exploded view of another pipe coupling and FIG. 3 is a schematic cross-sectional side view of a detail of a pipe coupling.

FIG. 2 discloses another embodiment of a pipe coupling. The clamping sleeve 13 of the outer sleeve 2 comprises a flat surface area 22. Correspondingly the nut 4 has at least one flat side area 23. In FIG. 2 the nut has a hexagonal shape such that the nut 4 comprises six flat side areas 23. When the flat side area 23 of the nut 4 is in abutment with the flat surface area 22 in the outer sleeve 2 they together hold the nut 4 preventing it from rotating when the screw 3 is tightened.

The nut 4 may also be for example triangular in shape or quadrangular in shape. Any other shape is also possible if the nut 4 comprises at least one flat side area 23.

Preferably the outer sleeve 2 comprises two flat surface areas 22 such that the outer sleeve 2 is symmetrical in shape. In such a case the screw 3 can be inserted in the holes 17 from either direction.

Figure 3:
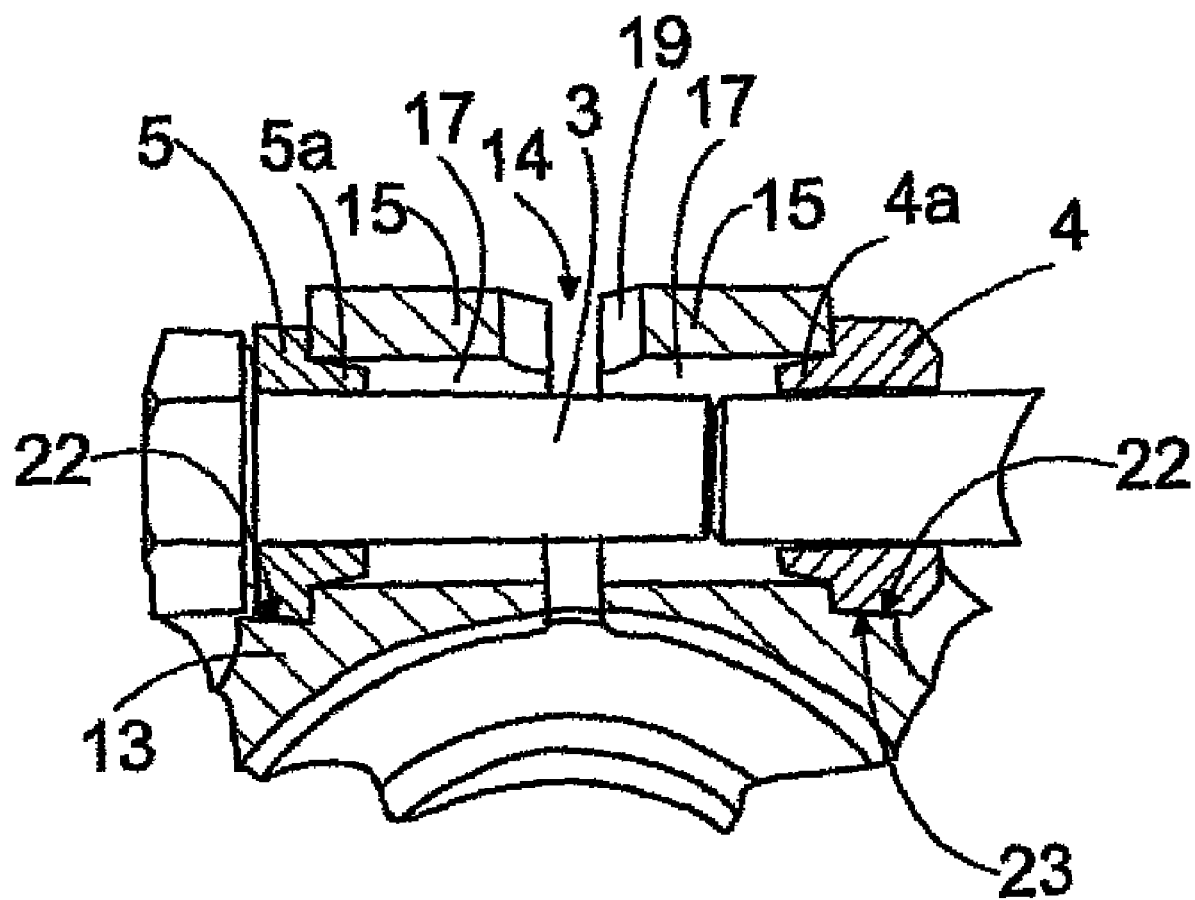

FIG. 3 shows a detail of a pipe coupling. In FIG. 3 especially the means for adjusting the opening 14 can be clearly seen. The nut 4 comprises a tapered part 4a. This tapered part 4a helps in steering the nut and in aligning the nut 4 and the screw 3. The washer 5 is arranged near the head 3a of the screw 3. The washer 5 also has a tapered part 5a for steering the washer and for aligning the screw 3 and the nut 4.

The washer 5 near the end 3a of the screw 3 also prevents the head 3a of the screw 3 from touching the flat surface area 22 of the outer sleeve 2 such that it is easy to tighten the screw 3.

It will be noted that the afore-described preferred embodiment of the invention is only a non-limiting example and that the invention can be varied in many ways within the scope of the following claims. For instance, although the size of the slot-like opening in the preferred embodiment is given as being about 2 mm, it will be understood that this opening may be both narrower and wider within the scope of the invention, preferably between 0-11 mm, and that the slot width can be varied in accordance with the size of the pipe involved. The number of gripping ridges and the number of abutment grooves can also vary and the gripping ridges and the grooves may both have a shape different to that illustrated. As mentioned before, the inventive pipe couplings are intended for use in water-carrying conduit systems. It will be understood, however, that they can also be used in conduit systems for conducting other substances, such as gas or petroleum, for instance. The pre-widening means may also be another distance holder than a cylindrical distance washer. For example, the pre-widening means may be a block with angular shape such as a cubic shape. The important thing is that the pre-widening means holds the distance between the edges of the slot-like opening. In some cases the features in this description can be used alone without the other features. On the other hand the features disclosed in this description can be combined to make various combinations.

The invention claimed is:

1. A pipe coupling for connection to a pipe end of a pipe made of polymer material, comprising:
    an inner sleeve for insertion into the pipe end and for abutment with the inner surface of the pipe end;
    an outer sleeve for abutment with the outer surface of the pipe end, said outer sleeve including a slot-like opening;
    an opening adjusting device for adjusting said opening, and
    a hollow cylinder positioned within edges of said slot-like opening such that the inner diameter of said outer sleeve is larger than the outer diameter of the pipe, said hollow cylinder being radially outward of said opening adjusting device and the aperture of said hollow cylinder being transverse to the longitudinal axis of said outer sleeve.

2. A pipe coupling according to claim 1, wherein said outer sleeve comprises at least one flat surface area and said opening adjusting device comprises a screw and a nut, whereby said nut comprises at least one flat side area to be positioned in abutment with said flat surface area.

3. A pipe coupling according to claim 1, wherein said opening adjusting device comprises a screw, a nut and a washer that is positioned at an end of the screw.

4. A pipe coupling according to claim 1, wherein said hollow cylinder is a distance washer.

* * * * *